United States Patent
Kim et al.

(10) Patent No.: US 8,493,435 B2
(45) Date of Patent: Jul. 23, 2013

(54) DATA MODULATION METHOD AND LIQUID CRYSTAL DISPLAY DEVICE USING THE SAME

(75) Inventors: Euitae Kim, Gyeonggi-do (KR); Hyeonho Son, Gyeonggi-do (KR); Joonyoung Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 419 days.

(21) Appl. No.: 12/966,019

(22) Filed: Dec. 13, 2010

(65) Prior Publication Data

US 2011/0310090 A1     Dec. 22, 2011

(30) Foreign Application Priority Data

Jun. 22, 2010   (KR) .................. 10-2010-0058945

(51) Int. Cl.
*H04N 13/00*     (2006.01)

(52) U.S. Cl.
USPC .............................. 348/43; 348/41; 348/46

(58) Field of Classification Search
USPC .................................... 348/41, 46
IPC ........................................ H04N 13/00
See application file for complete search history.

(56) References Cited

U.S. PATENT DOCUMENTS

| | | | |
|---|---|---|---|
| 2009/0009508 A1 | 1/2009 | Koo et al. | |
| 2010/0066820 A1 | 3/2010 | Park et al. | |
| 2010/0238274 A1* | 9/2010 | Kim et al. | 348/51 |
| 2011/0018983 A1* | 1/2011 | Kim et al. | 348/56 |

FOREIGN PATENT DOCUMENTS

| | | |
|---|---|---|
| KR | 10-2009-0004181 | 1/2009 |
| KR | 10-2010-0032284 | 3/2010 |

OTHER PUBLICATIONS

Office Action dated Feb. 27, 2013 from the Korean Intellectual Property Office in counterpart Korean application No. 10-2010-0058945.

* cited by examiner

*Primary Examiner* — Jay Patel
*Assistant Examiner* — Long Le
(74) *Attorney, Agent, or Firm* — Morgan, Lewis & Bockius LLP

(57) ABSTRACT

A data modulation method, comparing left eye image data during a (4N+1)-th frame period with previous frame data, selecting a preliminary modulation value for a left eye image, preliminarily modulating the left eye image data during the (4N+1)-th frame period to reach the preliminary modulation value for the left eye image, and secondarily modulating left eye image data during a (4N+2)-th frame period to reach the preliminary modulation value for the left eye image or a modulation value smaller than the preliminary modulation value.

21 Claims, 14 Drawing Sheets

PREVIOUS FRAME DATA

|  |  | 63 | 127 | 255 |
|---|---|---|---|---|
| CURRENT FRAME DATA | 63 | 63 → 63 | $M_2 → M_2$ | $M_1 → M_1$ |

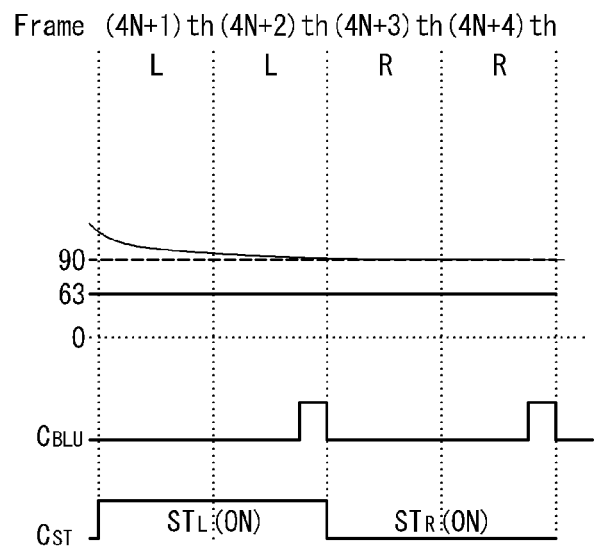

| | PREVIOUS FRAME DATA | | |
|---|---|---|---|
| | 63 | 127 | 255 |
| CURRENT FRAME DATA  63 | 63 → 63 | M6 → M7 | M4 → M5 |

| CURRENT FRAME DATA | PREVIOUS FRAME DATA | | | |
|---|---|---|---|---|
| | | 63 | 127 | 255 |
| | 63 | 90 → 90 | M₈ → M₉ | 63 → 63 |

DATA MODULATION METHOD AND LIQUID CRYSTAL DISPLAY DEVICE USING THE SAME

This application claims the benefit of Korea Patent Application No. 10-2010-0058945 filed on Jun. 22, 2010, the entire contents of which is incorporated herein by reference for all purposes as if fully set forth herein.

BACKGROUND

1. Field

This document relates to a data modulation method and a liquid crystal display using the same.

2. Related Art

Image display devices are classified into a stereoscopic technique and an autostereoscopic technique. The stereoscopic technique uses binocular parallax images which are great in the stereoscopic effect, and may have a type of using glasses and a type of not using glasses. In the type of using glasses ("glass type"), binocular parallax images are displayed on a direct view display panel or a projector by changing polarization directions or in the temporal division manner, and polarization glasses or liquid crystal shutter glasses are used to implement stereoscopic images. In the type of not using glasses ("glassless type"), the stereoscopic images are implemented by dividing optical axes of binocular parallax images, by using optical plates such as parallax barriers provided at front and rear surfaces of a display panel.

The glass type stereoscopic image display device typically displays left eye images and right eye images on a display panel in a temporal division manner. The glasses worn by a user is constituted by a left eye filter (or a left eye shutter) which transmits light for left eye images and a right eye filter (or a right eye shutter) which transmits light for right eye images. Thus, the user sees only the left eye images, for example, during odd frames, and sees only the right eye image during even frames, thereby obtaining a three-dimensional effect by a binocular parallax.

In a liquid crystal display to implement stereoscopic images, liquid crystal of the liquid crystal display is slow in a response speed due to characteristics such as unique viscosity and elasticity.

$$\tau_r \propto \frac{\gamma d^2}{\Delta\varepsilon |V_a^2 - V_F^2|} \quad (1)$$

In Equation (1), $\tau_r$ indicates a rising time when a voltage is applied to the liquid crystal, $V_a$ indicates an applied voltage, $V_F$ indicates Freederick transition voltage when the liquid crystal molecules starts a tilted motion, d indicates a cell gap of a liquid crystal cell, and $\gamma$ indicates a rotational viscosity of the liquid crystal molecules.

$$\tau_f \propto \frac{\gamma d^2}{K} \quad (2)$$

In Equation (2), $\tau_f$ indicates a falling time when the liquid crystal is recovered to an original position due to the elastic recovery after the liquid crystal stops being applied with a voltage, and K indicates a modulus of elasticity unique to the liquid crystal.

In the liquid crystal display, as a method for improving the response speed of the liquid crystal, there is known an over-driving method. The over-driving method modulates a data value for a current frame to a higher value if a data value of an input image in the current frame becomes larger than that in a previous frame, whereas it modulates a data value for a current frame to a lower value if a data value of the input image in the current frame becomes smaller than that in a previous frame, thereby adjusting data voltages applied to liquid crystal cells to compensate a slow response characteristic of the liquid crystal. The over-driving method may be implemented by a look-up table where the data values for previous and current frames of an input image are input and corresponding pre-stored modulation values are output. However, when an overdriving method for 2D images is applied to 3D images, the overdriving method has a problem in that a brightness difference is generated depending on a grayscale for a previous frame data in representing the same grayscale in 3D image data. Further, a 3D crosstalk occurs in which left eye images and right eye images overlap each other due to the brightness difference.

SUMMARY

Embodiments of this document provide a data modulation method and a liquid crystal display using the same, capable of preventing the brightness difference and the 3D crosstalk.

According to an exemplary embodiment of this document, there is provided a data modulation method comprising comparing a first left eye image data of a (4N+1)-th (where N is a positive integer) frame period with previous frame data of a 4N-th frame period, selecting a preliminary modulation value for a left eye image based on a result of the comparison, and preliminarily modulating the first left eye image data to reach the preliminary modulation value for the left eye image; secondarily modulating a second left eye image data of a (4N+2)-th frame period to reach the preliminary modulation value for the left eye image or a modulation value smaller than the preliminary modulation value; comparing a first right eye image data of a (4N+3)-th frame period with previous frame data of the (4N+2)-th frame period, selecting a preliminary modulation value for a right eye image based on a result of the comparison, and preliminarily modulating the first right eye image data to reach the preliminary modulation value for the right eye image; and secondarily modulating a second right eye image data of a (4N+4)-th frame period to reach the preliminary modulation value for the right eye image or a modulation value smaller than the preliminary modulation value.

According to an exemplary embodiment of this document, there is provided a liquid crystal display comprising a display panel configured to display a left eye image during (4N+1)-th (where N is a positive integer) and (4N+2)-th frame periods and display a right eye image during (4N+3)-th and (4N+4)-th frame periods; a backlight unit configured to provide light to the display panel; and a data modulation unit configured to modulate each piece of data during the (4N+1)-th frame period to the (4N+4)-th frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 7A to 7C are waveform diagrams illustrating a data modulation method according to a second embodiment of this document;

FIG. 8 is a diagram illustrating the data modulation method in FIGS. 7A to 7C using a lookup table;

DETAILED DESCRIPTION

Figure 1:
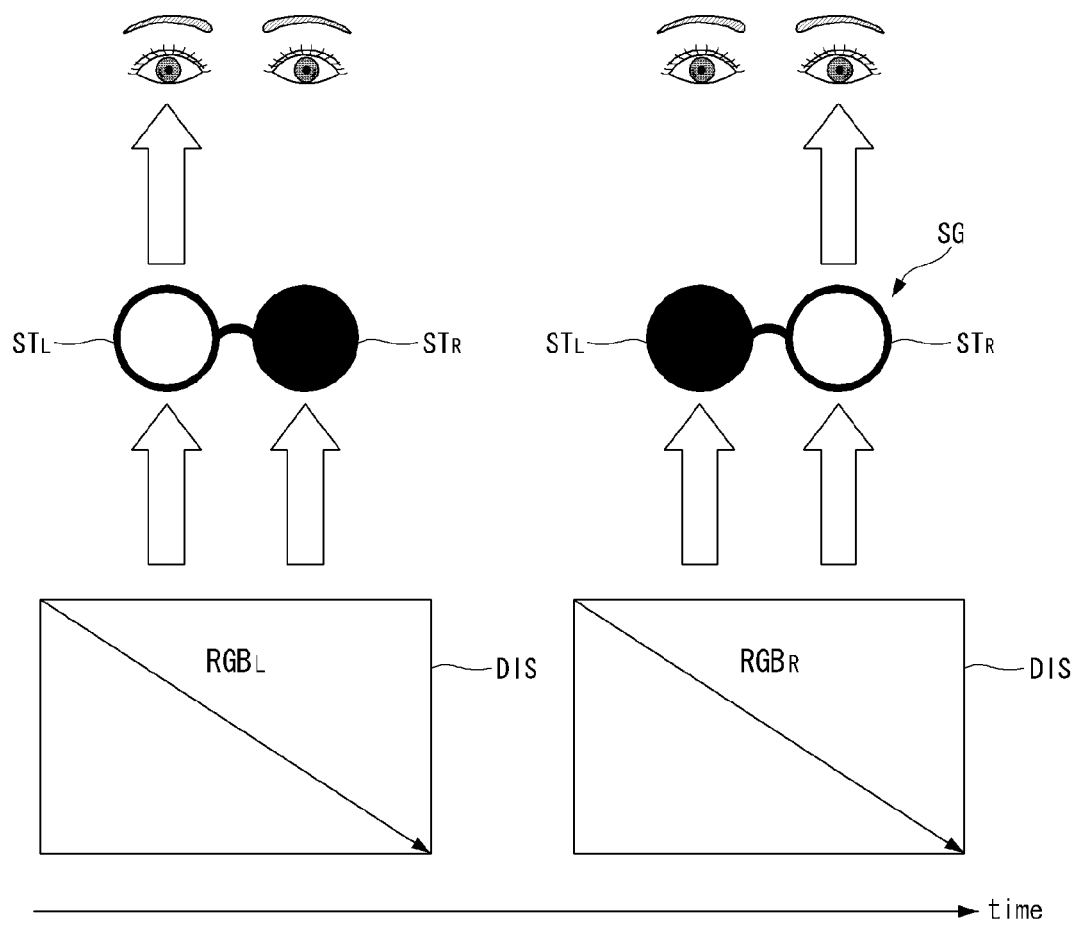
FIG. 1 is a diagram illustrating an operation principle of a shutter glass type stereoscopic image display device according to an embodiment of this document.

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Names of the respective elements used in the following description are selected for convenience of writing the specification and may be thus different from those in actual products.

This document is applicable to a glass type stereoscopic image display device in which a left eye image and a right eye image are temporally divided and light rays reaching a left eye and a right eye of a user are divided through glasses.

FIG. 1 is a diagram illustrating an operation principle of a shutter glass type stereoscopic image display device according to an embodiment of this document. In FIG. 1, a black part of the shutter glasses GS is a turned-off shutter for blocking light directing toward a viewer and a white part thereof is a turned-on shutter for transmitting light directing toward the viewer. In FIG. 1, if a liquid crystal display is selected as a display panel DIS, a backlight unit BLU providing light to the display device DIS is necessary.

The left eye shutter $ST_L$ of the shutter glasses SG is opened when left eye image data RGBL is written in the display panel DIS during odd numbered frame periods at the 3D mode. The right eye shutter $ST_R$ is opened when right eye image data RGBR thereof is written in the display panel DIS during even numbered frame periods at the 3D mode. The left eye shutter $ST_L$ and the right eye shutter STR of the shutter glasses SG are electrically controlled via a wired or wireless interface and synchronized with the display panel DIS. Therefore, the viewer sees only the left eye images with the left eye during the odd numbered frame periods and sees only the right eye image with the right eye during the even numbered frame periods, thereby obtaining a three-dimensional effect by a binocular parallax.

Figure 2:
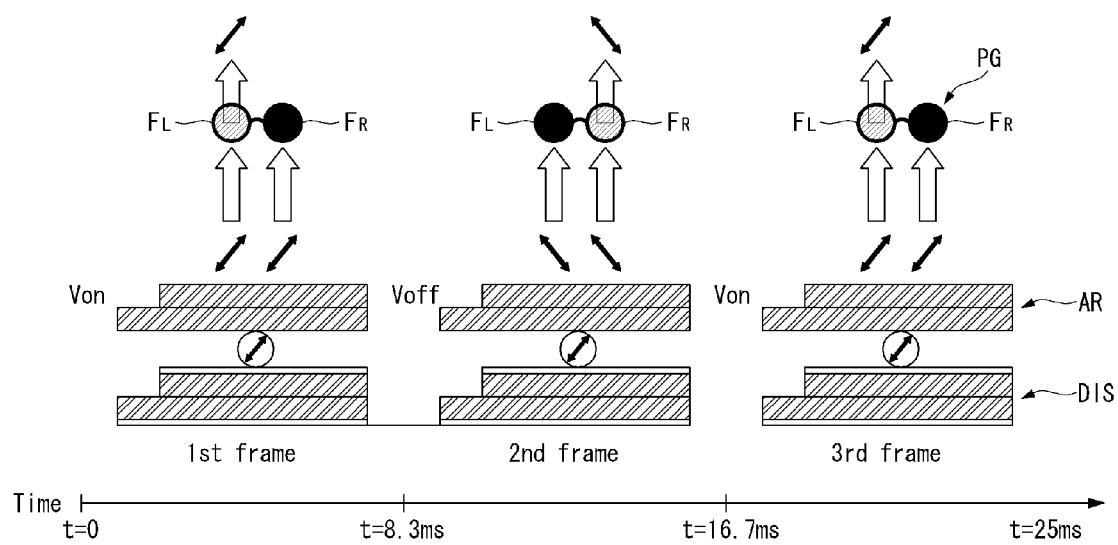
FIG. 2 is a diagram illustrating an operation principle of a polarization glass type stereoscopic image display device.

FIG. 2 is a diagram illustrating an operation principle of a polarization glasses type stereoscopic image display device according to an embodiment of this document. Referring to FIG. 2, at the 3D mode, the display panel DIS displays left eye image data RGBL during the odd numbered period and right eye image data RGBR during the even numbered period. Onto the display panel DIS, an active retarder AR where polarization characteristics for the left eye image and polarization characteristics for the right eye image are converted to be different from each other is attached.

The light for the left eye image and the right eye image which are temporally divided and displayed on the display panel DIS is converted to have, for example, a left-handed polarization via polarizers of the display panel DIS and then is incident on the active retarder AR. The active retarder AR is synchronized with the display panel DIS. When the left eye image is displayed on the display panel DIS, the active retarder AR is electrically controlled and does not convert the polarization characteristics of the light from the display panel DIS, thereby transmitting the light as it is. In contrast, when the right eye image is displayed on the display panel DIS, the active retarder AR converts the polarization characteristics of the light from the display panel DIS to have different polarization, for example, right-handed polarization. The active retarder AR may be implemented by a TN (twisted nematic) mode liquid crystal panel which includes a common electrode and a plurality of scan electrodes opposite to each other with the liquid crystal layer interposed therebetween, having no polarizers, color filters, black matrices, and the like. The active retarder AR may transmit incident light as it is when a Von voltage is applied to the scan electrodes, and may convert polarization characteristics of the incident light to be delayed in phase by $\lambda/2$ (where is $\lambda$ a wavelength of light) when a Voff voltage is applied to the scan electrodes.

Polarization glasses PG comprise a left eye filter $F_L$ which transmits only light having undergone the left-handed polarization and a right eye filter $F_R$ which transmits only light having undergone the right-handed polarization. Therefore, the viewer sees only the left eye images with the left eye during the odd numbered frame periods and sees only the right eye image with the right eye during the even numbered frame periods, thereby obtaining a three-dimensional effect by a binocular parallax.

The display panel DIS in FIGS. 1 and 2 can display 2D flat images at the 2D mode, and display 3D images which are temporally divided into a left eye image and a right eye image at the 3D mode.

Figure 3A:
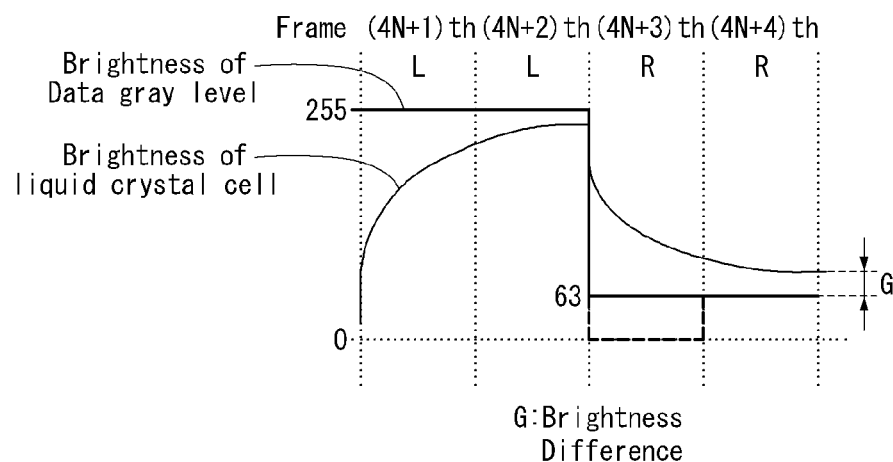
FIGS. 3A and 3B are diagrams illustrating a brightness difference when an overdriving method for 2D images is applied to 3D images.
Figure 3B:
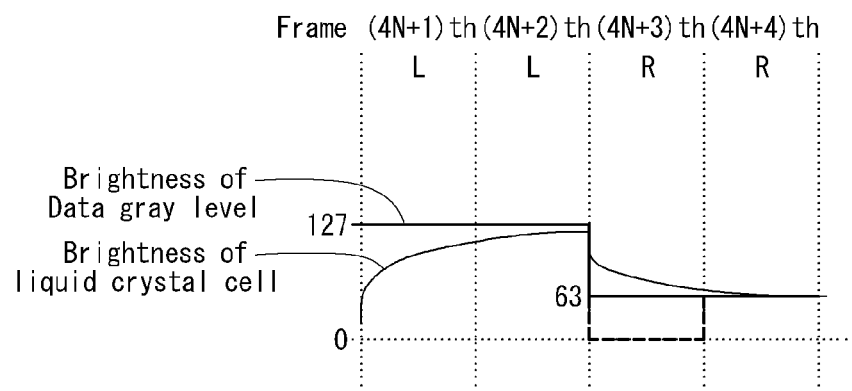

FIGS. 3A and 3B are diagrams illustrating a brightness difference G when an overdriving method for 2D images is applied to 3D images. First of all, data for 2D images having undergone the overdriving modulation satisfies Equations (3) to (5).

$$Fn(RGB)<Fn-1(RGH)\rightarrow ODC(RGB)<Fn(RGB) \quad (3)$$

$$Fn(RGB)=Fn-1(RGB)\rightarrow ODC(RGB)=Fn(RGB) \quad (4)$$

$$Fn(RGB)>Fn-1(RGB)\rightarrow ODC(RGB)>Fn(RGB) \quad (5)$$

With respect to the same pixel, the data of 2D images having undergone the overdriving modulation is set to a larger value than a data value for a current frame Fn if the data value for the current frame becomes larger than that for a previous frame Fn−1, whereas the data of 2D images having undergone the overdriving modulation is set to a smaller value than a data value for a current frame Fn if the data value for the current frame Fn is smaller than that for a previous frame Fn−1. Also, with respect to the same pixel, if a data value for a current frame Fn is the same as that for a previous frame Fn−1, the data of 2D image having undergone the overdriving modulation is set to the data value for the current frame.

The overdriving method for 2D images may employ the modulation methods disclosed in U.S. Pat. Nos. 6,753,837, 6,760,059, 6,771,242, 6,828,816, 6,828,816, 7,023,414, 7,106,287, 7,123,226, 7,136,037, 7,145,534, 7,161,575, 7,283,113, 7,342,564, 7,446,749 and the like, field by the present applicant.

Referring to FIGS. 3A and 3B, the display panel DIS according to an embodiment, in order to improve the response characteristic of the liquid crystal, consecutively displays left eye images of the (4N+1)-th (where N is a positive integer) and (4N+2)-th frame periods and consecutively displays right eye images of the (4N+3)-th and (4N+4)-th frame periods. FIGS. 3A and 3B show data values input to one pixel and variation of the response characteristic of the liquid crystal depending thereon.

In FIG. 3A, the left eye image data has a G255 grayscale value, and the right eye image data has a G63 grayscale value. As shown in FIG. 3A, when RGB data is 8-bit data, its color depth is represented by G0 to G255 grayscales.

The left eye image data having G255 grayscale value is input during the (4N+1)-th and (4N+2)-th frame periods, and the right eye image data having G63 grayscale value is input during the (4N+3)-th and (4N+4)-th frame periods. The data value (that is, a grayscale value) of the (4N+3)-th frame period is smaller than the data value of the (4N+2)-th frame period, and thus the left eye image data of the (4N+3)-th frame period is modulated as shown in Equation (3). That is, the left eye image data of the (4N+3)-th frame period is modulated to reach a data value smaller than the G63 grayscale value and equal to or greater than the G0 grayscale value.

The data value of the (4N+4)-th frame period is the same as the data value of the (4N+3)-th frame period which is a previous frame period, and thus the data value of the (4N+4)-th frame period is set as it is, as shown in Equation (4). However, since the difference between the G255 grayscale and the G63 grayscale is great, even if the data value of the (4N+3)-th frame period is modulated to reach the G0 grayscale value, the ODC-modulated right eye image data cannot represent the G63 grayscale of the limited (4N+3)-th and the (4N+4)-th frame periods.

In FIG. 3B, the left eye image data has a G127 grayscale value and the right eye image data has a G63 grayscale value. Data having the G127 grayscale value is input during the (4N+2)-th frame period, and data having the G63 grayscale value is input during the (4N+3)-th and the (4N+4)-th frame periods.

The left eye image data of the (4N+3)-th frame period is modulated to reach a data value smaller than the G63 grayscale value and equal to or greater than the G0 grayscale value. The data value of the (4N+4)-th frame period is the same as the data value of the (4N+3)-th frame period which is a previous frame period, and thus the data value of the (4N+4)-th frame period is set as it is, i.e., the input right eye image date, as shown in Equation (4). Thus, since the difference between the G127 grayscale and the G63 grayscale is not great, if the data value of the (4N+3)-th frame period is modulated to reach the G0 grayscale value, the ODC-modulated right eye image data of the (4N+4)-th frame period can represent the G63 grayscale even when the data of the (4N+4)-th frame period is set as it is.

As a result, as shown in FIGS. 3A and 3B, the target grayscale can be represented or cannot be represented depending on the previous frame data, and thus the brightness difference is generated. Therefore, this document proposes an optimized overdriving method when 3D images are implemented such that left eye images are consecutively displayed during the (4N+1)-th and (4N+2)-th frame periods and right eye images are consecutively displayed during the (4N+3)-th and (4N+4)-th frame periods.

Figure 4:
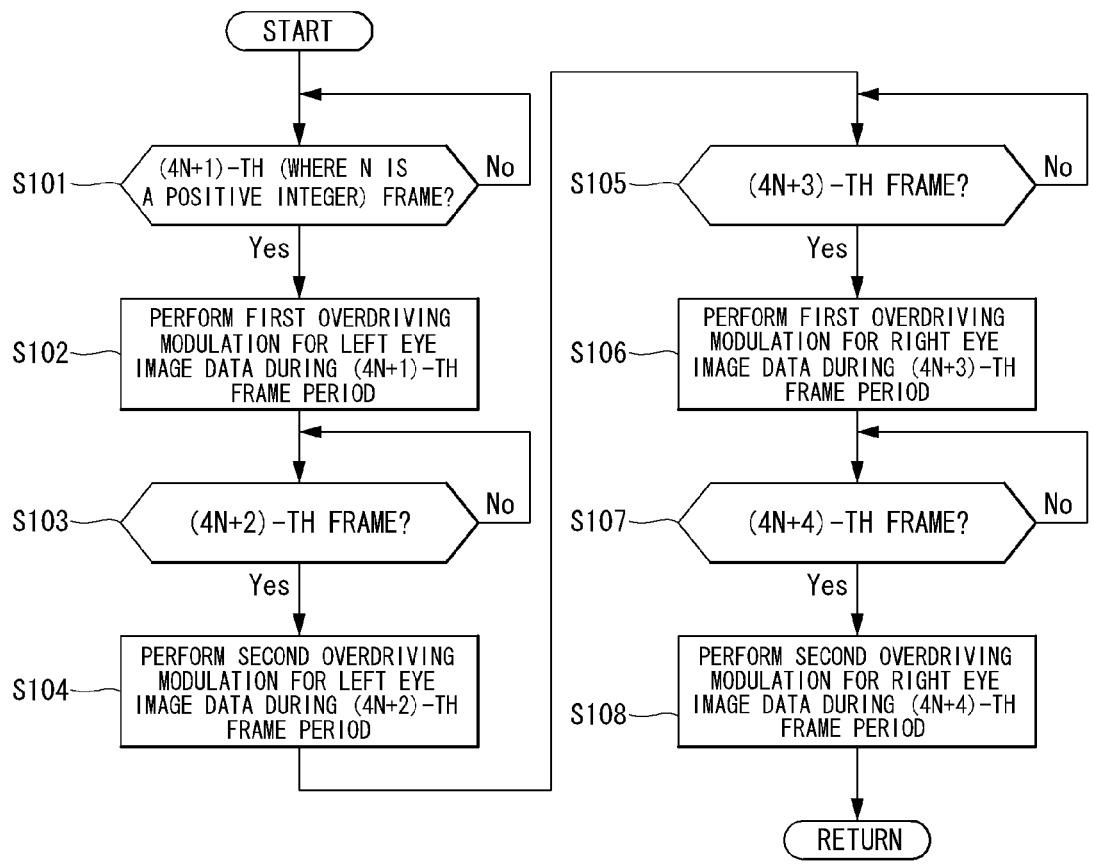
FIG. 4 is a flowchart illustrating a data modulation method according to an embodiment of this document.

FIG. 4 is a flowchart illustrating a data modulation method according to an embodiment of this document. In FIG. 4, left eye image data of the (4N+1)-th frame period undergoes a first overdriving modulation. In the first overdriving modulation, left eye image data of the (4N+1)-th frame period is compared with previous right eye image data of the 4N-th frame period which is a previous frame period, a preliminary modulation value for the left eye image is selected based on a result of the comparison, and the left eye image data of the (4N+1)-th frame period is preliminarily modulated to reach the selected preliminary modulation value for the left eye image. This will be described in detail with reference to FIGS. 5 to 12 (S101 and S102).

According to an embodiment of this document, left eye image data of (4N+2)-th frame period undergoes a second overdriving modulation to reach the above-described preliminary modulation value for the left eye image or is modulated to reach a secondary modulation value smaller than the preliminary modulation value. In the second overdriving modulation, the left eye image data of the (4N+2)-th frame period is not compared with the left eye image data of the (4N+1)-th frame period which is a previous frame period, but the left eye image data of the (4N+2)-th frame period is modulated to reach the selected preliminary modulation value for the left eye image or to reach the secondary modulation value for the left eye image smaller than the preliminary modulation value for the left eye image. This will be described in detail with reference to FIGS. 5 to 12 (S103 and S104).

Right eye image data of the (4N+3)-th frame period undergoes the first overdriving modulation. In the first overdriving modulation, right eye image data of the (4N+3)-th frame period is compared with left eye image data of the (4N+2)-th frame period which is a previous frame period, a preliminary modulation value for the right eye image is selected based on a result of the comparison, and the right eye image data of the (4N+3)-th frame period is modulated to reach the selected preliminary modulation value for the right eye image (S105 and S106).

According to an embodiment of this document, right eye image data of (4N+4)-th frame period undergoes the second overdriving modulation to reach the above-described preliminary modulation value for the right eye image or is modulated to reach a secondary modulation value for the right eye image smaller than the preliminary modulation value for the right eye image. In the second overdriving modulation, the right eye image data of the (4N+4)-th frame period is not compared with the right eye image data of the (4N+3)-th frame period which is a previous frame period, but the right eye image data of the (4N+4)-th frame period is modulated to reach the selected preliminary modulation value for the right eye image or to reach the secondary modulation value for the right eye image smaller than the preliminary modulation value for the right eye image (S107 and S108).

Figure 5A:
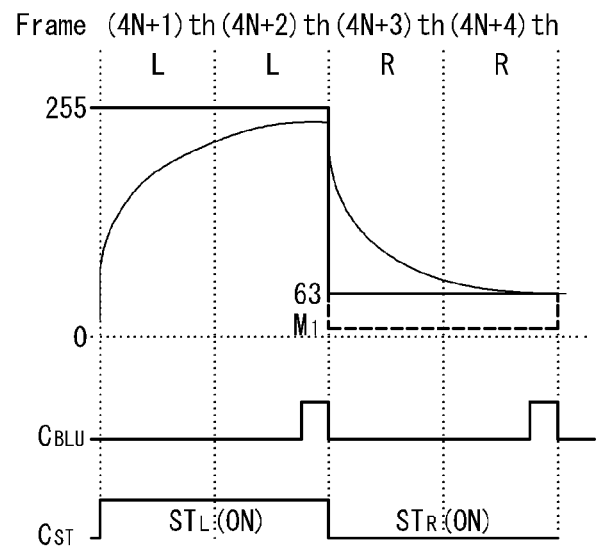
FIGS. 5A to 5C are waveform diagrams illustrating a data modulation method according to a first embodiment of this document.
Figure 5B:
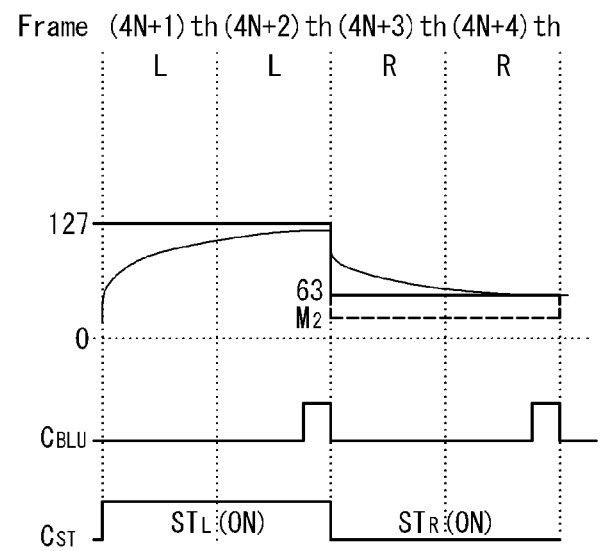
Figures 5C, 6:
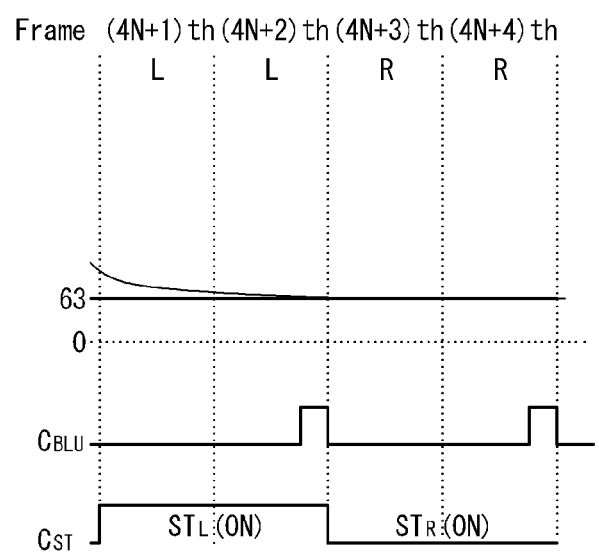
FIG. 6 is a diagram illustrating the data modulation method in FIGS. 5A to 5C, using a lookup table.

FIGS. 5A to 5C are waveform diagrams illustrating a data modulation method according to a first embodiment of this document. Referring to FIGS. 5A to 5C, in the first embodiment of this document, the second overdriving modulation value is the same as the first overdriving modulation value.

In FIG. 5A, left eye image data of the (4N+1)-th and (4N+2)-th frame periods has a G255 grayscale value, and right eye image data of the (4N+3)-th and (4N+4)-th frame periods has a G63 grayscale value. The right eye image data of the (4N+3)-th frame period undergoes the first overdriving modulation. In the first overdriving modulation during the (4N+3)-th frame period, the right eye image data of the (4N+3)-th frame period is compared with the left eye image data of the (4N+2)-th frame period. Since the right eye image data of the (4N+3)-th frame period is smaller than the left eye image data of the (4N+2)-th frame period, the right eye image data of the (4N+3)-th frame period is modulated as shown in Equation (3). That is, the right eye image data of the (4N+3)-th frame period is modulated to reach a value $M_1$ smaller than the G63 grayscale value and equal to or greater than the G0 grayscale value.

The right eye image data of the (4N+4)-th frame period undergoes the second overdriving modulation. As shown in FIG. 5A, the second overdriving modulation value is the same as the first overdriving modulation value. Thus, the second overdriving modulation value becomes the value $M_1$. As a result, the overdriving modulation is also performed during the (4N+4)-th frame period, and thereby the right eye image data of the (4N+4)-th frame period can represent the G63 grayscale.

The first and second overdriving modulations for the left eye image data of the (4N+1)-th and (4N+2)-th frame periods is the same as the above-described first and second overdriving modulations for the right eye image data of the (4N+3)-th and (4N+4)-th frame periods.

A backlight unit, as shown in FIG. 5A, is turned on after the response delay time of the liquid crystal in the (4N+2)-th and (4N+4)-th frame periods, and is turned off during the (4N+1)-th and (4N+3)-th frame periods and during the respective initial times of the (4N+2)-th and (4N+4)-th frame periods. That is to say, the backlight unit is turned on a duration where the response delay time of the liquid crystal has elapsed and the rising of the liquid crystal is completed. Thereby, since a grayscale to be represented by an associated pixel is correctly represented, it is possible to improve the 3D crosstalk.

The liquid crystal shutter glasses alternately open the left eye shutter $ST_L$ and the right eye shutter $ST_R$. The left eye images are displayed on the display panel during the (4N+1)-th and (4N+2)-th frame periods, and thus the left eye shutter $ST_L$ is opened and the right eye shutter $ST_R$ is closed. The right eye images are displayed on the display panel during the (4N+3)-th and (4N+4)-th frame period, and thus the right eye shutter $ST_R$ is opended and the left eye shutter $ST_L$ is closed.

The turning-on timing of the backlight unit and the opening and closing timing of the liquid crystal shutter glasses in FIGS. 5B, 5C, 7A to 7C, 9A to 9C, and FIGS. 11A to 11C are the same as those described with reference to FIG. 5A.

Referring to FIG. 5B, left eye image data of the (4N+1)-th and (4N+2)-th frame periods has a G127 grayscale value, and right eye image data of the (4N+3)-th and (4N+4)-th frame periods has a G63 grayscale value. As shown in FIG. 5B, the right eye image data of the (4N+3)-th frame period undergoes the first overdriving modulation. Since the right eye image data of the (4N+3)-th frame period is smaller than the left eye image data of the (4N+2)-th frame period, the right eye image data of the (4N+3)-th frame period is modulated as shown in Equation (3). Therefore, the right eye image data of the (4N+3)-th frame period is modulated to reach a value $M_2$ smaller than the G63 grayscale value and equal to or greater than the G0 grayscale value.

The right eye image data of the (4N+4)-th frame period undergoes the second overdriving modulation. As shown in FIG. 5B, the second overdriving modulation value is the same as the first overdriving modulation value. Thus, the second overdriving modulation value becomes the value $M_2$.

Referring to FIG. 5C, left eye image data of the (4N+1)-th and (4N+2)-th frame periods has a G63 grayscale value, and right eye image data of the (4N+3)-th and (4N+4)-th frame periods also has the G63 grayscale value. As shown in FIG. 5C, the right eye image data of the (4N+3)-th frame period undergoes the first overdriving modulation. Since the right eye image data of the (4N+3)-th frame period is the same as the left eye image data of the (4N+2)-th frame period, the right eye image data of the (4N+3)-th frame period is modulated as shown in Equation (4). Therefore, the right eye image data of the (4N+3)-th frame period is set to reach the G63 grayscale value which is a data value for the current frame.

The right eye image data of the (4N+4)-th frame period undergoes the second overdriving modulation. As shown in FIG. 5C, the second overdriving modulation value is the same as the first overdriving modulation value. Therefore, the second overdriving modulation value is the G63 grayscale value.

FIG. 6 is a diagram illustrating the data modulation method in FIGS. 5A to 5C using a lookup table. In FIGS. 5A to 5C, the grayscale values for the right eye image data of the (4N+3)-th and (4N+4)-th frame periods are the G63 grayscale and are the same as each other, and the grayscale values for the left eye image data of the (4N+2)-th frame period are the G255 grayscale, the G127 grayscale, and the G63 grayscale, and are thus different from each other.

When the grayscale value for the left eye image data of the (4N+2)-th frame period is the G255 grayscale, the right eye image data of the (4N+3)-th and (4N+4)-th frame periods is modulated to reach the value $M_1$. When the grayscale value for the left eye image data of the (4N+2)-th frame period is the G127 grayscale, the right eye image data of the (4N+3)-th and (4N+4)-th frame periods is modulated to reach the value $M_2$. When the grayscale value for the left eye image data of the (4N+2)-th frame period is the G63 grayscale, the right eye image data of the (4N+3)-th and (4N+4)-th frame periods is set to reach the G63 grayscale value as it is.

Figure 7A:
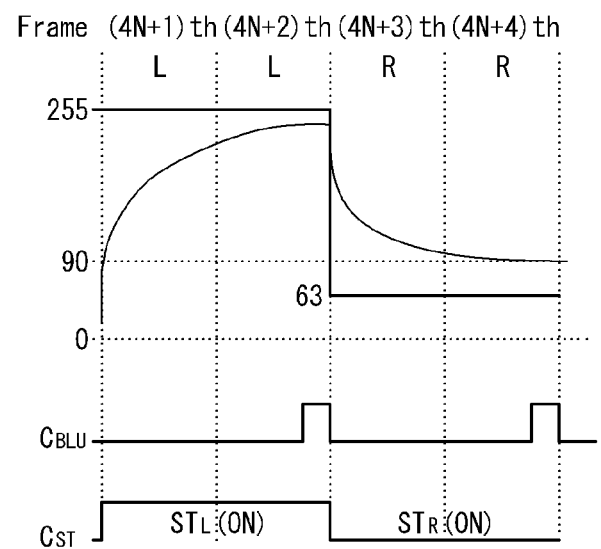
Figure 7B:
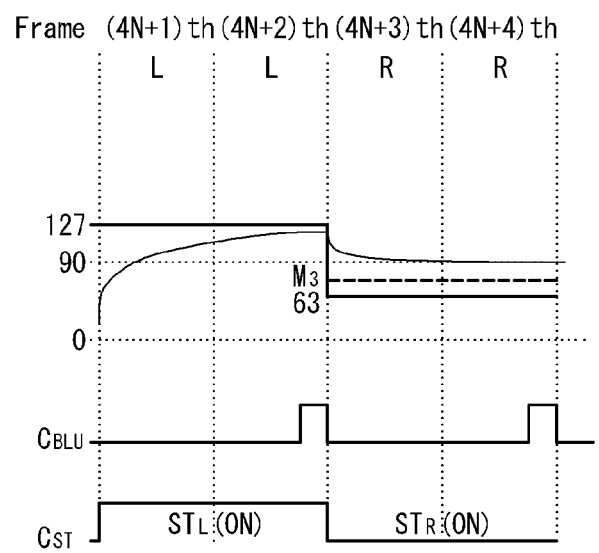

FIGS. 7A to 7C are waveform diagrams illustrating a data modulation method according to a second embodiment of this document. Referring to FIGS. 7A to 7C, in the second embodiment of this document, the second overdriving modulation value is the same as the first overdriving modulation value. The second embodiment of this document is for solving the case where the great difference between grayscale values for the left eye image data and the right eye image data results in not correctly representing the grayscale for the left eye image data or the right eye image data even by the overdriving modulation, like the case in FIG. 3A.

In FIG. 7A, left eye image data of the (4N+1)-th and (4N+2)-th frame periods has a G255 grayscale value, and right eye image data of the (4N+3)-th and (4N+4)-th frame periods has a G63 grayscale value. The right eye image data of the (4N+3)-th frame period undergoes the first overdriving modulation. The first overdriving modulation during the (4N+3)-th frame period is performed by comparing the right eye image data of the (4N+3)-th frame period with the left eye image data of the (4N+2)-th frame period which is a previous frame period. The right eye image data of the (4N+4)-th frame period undergoes the second overdriving modulation. The second overdriving modulation value is the same as the first overdriving modulation value.

However, even if the right eye image data of the (4N+3)-th and (4N+4)-th frame periods is modulated to reach the G0 grayscale value which is the maximum overdriving modulation value, since the difference between the grayscale values for the right eye image data and the left eye image data is great, the right eye image data cannot represent the G63 grayscale. In this case, like in FIG. 3A, there is a problem in that a grayscale for a current frame cannot be represented. Therefore, in order to solve this problem, a target brightness of the current frame period is measured, and the overdriving modulation is performed with respect to a grayscale enabling reaching the target brightness. In the case of FIG. 7A, although the right eye image data of the (4N+3)-th and (4N+4)-th frame periods has the G63 grayscale value, the right eye image data is modulated to reach a G90 grayscale which is a grayscale value (data value) enabling reaching a target brightness.

In other words, in the 3D images, a grayscale value for a current frame data is modified to a modulation value representing a target brightness for each grayscale which is set in advance based on a difference between left eye (or right eye) image data of a previous frame period and right eye (or left eye) image data of a current frame period, by using the overdriving method. As a result, when the 3D images are implemented, the decrease in the brightness for the right eye (left eye) image data of the current frame period due to the influence of the left eye (or right eye) image data of the previous frame period can be compensated by the target brightness.

With reference to FIGS. 7A to 7C, modulation values and a method of measuring a target brightness will be described. When left eye image data is changed to right eye image data, a modulation value enabling reaching a target brightness for each grayscale for the right eye image data is obtained. In this case, liquid crystal shutter glasses and an optical sensor are disposed on a sample display panel, such as a liquid crystal display panel, and left eye image data is input to the sample liquid crystal panel and then right eye image data is input thereto. While grayscales for the left eye image data and the right eye image data are varied, brightness of the sample liquid crystal panel detected by the optical sensor through a right eye shutter of the liquid crystal shutter glasses is measured. The brightness of the sample liquid crystal panel through the right eye shutter of the liquid crystal shutter glasses when the left eye image data is changed to the right eye image data is set as a corresponding grayscale value which represents a target brightness for each grayscale for the right eye image data, and a modulation value for each grayscale is set to a modulation value for modulating the right eye image data to reach the grayscale value representing the target brightness.

The first and second overdriving modulation for the left eye image data of the (4N+1)-th and (4N+2)-th frame periods is the same as the first and second overdriving modulation for the right eye image data of the (4N+3)-th and (4N+4)-th frame periods.

In FIG. 7B, left eye image data of the (4N+1)-th and (4N+2)-th frame periods has a G127 grayscale value, and right eye image data of the (4N+3)-th and (4N+4)-th frame periods has a G63 grayscale value. The right eye image data of the (4N+3)-th frame period undergoes the first overdriving modulation. The right eye image data of the (4N+3)-th frame period in FIG. 7B is modulated to reach the G90 grayscale value which enables reaching the target brightness in the same manner as FIG. 7A, and thus the right eye image data of the (4N+3)-th frame period is modulated to reach a value M3 greater than the G63 grayscale value and smaller than the G127 grayscale value. The right eye image data of the (4N+4)-th frame period undergoes the second overdriving modulation. The second overdriving modulation value is the same as the first overdriving modulation value. Thus, the second overdriving modulation value becomes the value $M_3$.

In FIG. 7C, left eye image data of the (4N+1)-th and (4N+2)-th frame periods has a G63 grayscale value, and right eye image data of the (4N+3)-th and (4N+4)-th frame periods has a G63 grayscale value. The right eye image data of the (4N+3)-th frame period undergoes the first overdriving modulation. The right eye image data of the (4N+3)-th frame period in FIG. 7C is modulated to a modulation value M3 to reach the G90 grayscale value which enables reaching the target brightness in the same manner as FIG. 7A, and thus the right eye image data of the (4N+3)-th frame period is set to reach the G90 grayscale value, not the G63 grayscale value which is a data value for the current frame. The right eye image data of the (4N+4)-th frame period undergoes the second overdriving modulation. The second overdriving modulation value is the same as the first overdriving modulation value. Thus, the second overdriving modulation value is the G90 grayscale value.

FIG. 8 is a diagram illustrating the data modulation method in FIGS. 7A to 7C using a lookup table. In FIGS. 7A to 7C, the grayscale values for the right eye image data of the (4N+3)-th and (4N+4)-th frame periods are the G63 grayscale and are the same as each other, and the grayscale values for the left eye image data of the (4N+2)-th frame period are the G255 grayscale, the G127 grayscale, and the G63 grayscale, and are thus different from each other.

When the grayscale value for the left eye image data of the (4N+2)-th frame period is the G255 grayscale, the right eye image data of the (4N+3)-th and (4N+4)-th frame periods has the G63 grayscale value and is modulated to reach the G90 grayscale value. When the grayscale value for the left eye image data of the (4N+2)-th frame period is the G127 grayscale, the right eye image data of the (4N+3)-th and (4N+4)-th frame periods is modulated to reach the value $M_3$. When the grayscale value for the left eye image data of the (4N+2)-th frame period is the G63 grayscale, the right eye image data of the (4N+3)-th and (4N+4)-th frame periods is modulated to reach the G90 grayscale value.

Figure 9A:
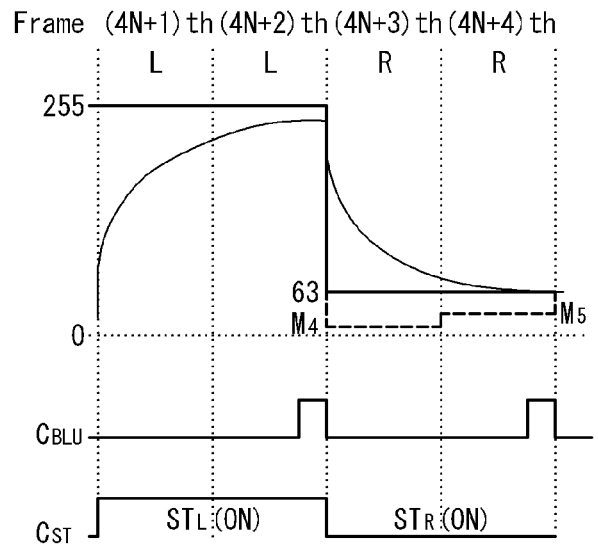
FIGS. 9A to 9C are waveform diagrams illustrating a data modulation method according to a third embodiment of this document.
Figure 9B:
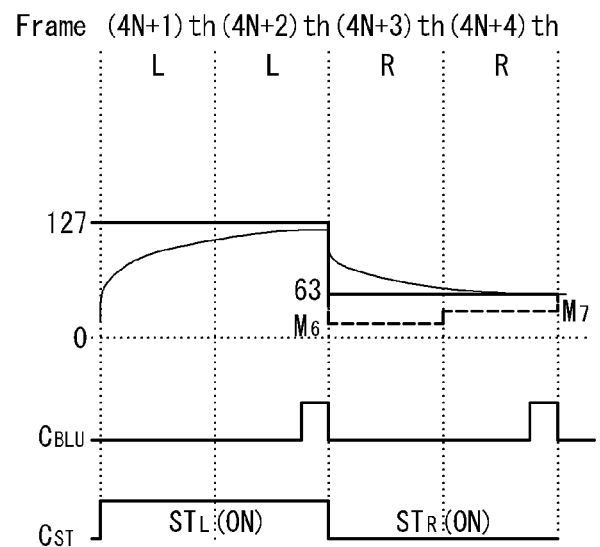
Figures 9C, 10:
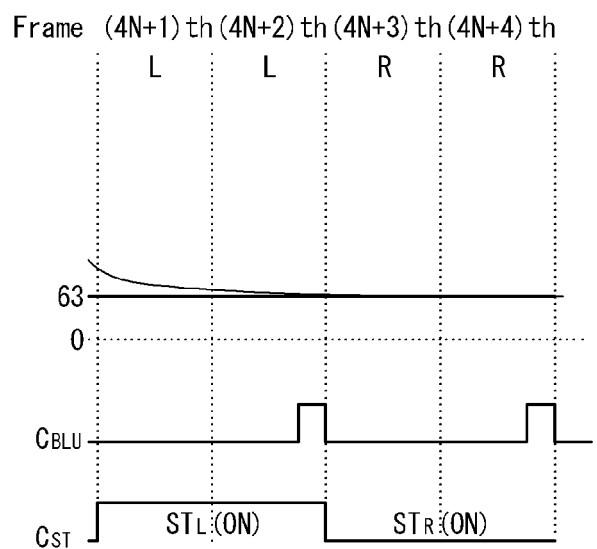
FIG. 10 is a diagram illustrating the data modulation method in FIGS. 9A to 9C using a lookup table.

FIGS. 9A to 9C are waveform diagrams illustrating a data modulation method according to a third embodiment of this document. Referring to FIGS. 9A to 9C, in the third embodiment of this document, the second overdriving modulation value is the same as the first overdriving modulation value or smaller than the first overdriving modulation value.

In FIG. 9A, left eye image data of the (4N+1)-th and (4N+2)-th frame periods has a G255 grayscale value, and right eye image data of the (4N+3)-th and (4N+4)-th frame periods has a G63 grayscale value. The right eye image data of the (4N+3)-th frame period undergoes the first overdriving modulation. The first overdriving modulation during the (4N+3)-th frame period is performed by comparing the right eye image data of the (4N+3)-th frame period with the left eye image data of the (4N+2)-th frame period which is a previous frame period. In FIG. 9A, since the right eye image data of the (4N+3)-th frame period is smaller than the left eye image data of the (4N+2)-th frame period, the right eye image data of the (4N+3)-th frame period is modulated as shown in Equation (3). Therefore, the right eye image data of the (4N+3)-th frame period is modulated to reach a value $M_4$ which is smaller than the G63 grayscale value and equal to or greater than the G0 grayscale value.

The right eye image data of the (4N+4)-th frame period undergoes the second overdriving modulation. In FIG. 9A, the second overdriving modulation value is modified to a value M5 which is smaller than the value M4. As a result, the right eye image data of the (4N+4)-th frame period can represent the G63 grayscale by performing the overdriving modulation during the (4N+4)-th frame period as well.

The first and second overdriving modulation for the left eye image data of the (4N+1)-th and (4N+2)-th frame periods is the same as the first and second overdriving modulation for the right eye image data of the (4N+3)-th and (4N+4)-th frame periods.

In FIG. 9B, left eye image data of the (4N+1)-th and (4N+2)-th frame periods has a G127 grayscale value, and right eye image data of the (4N+3)-th and (4N+4)-th frame periods has a G63 grayscale value. The right eye image data of the (4N+3)-th frame period undergoes the first overdriving modulation. In FIG. 9B, since the right eye image data of the (4N+3)-th frame period is smaller than the left eye image data of the (4N+2)-th frame period, the right eye image data of the (4N+3)-th frame period is modulated as shown in Equation (3). Therefore, the right eye image data of the (4N+3)-th frame period is modulated to reach a value $M_6$ which is smaller than the G63 grayscale value and equal to or greater than the G0 grayscale value.

The right eye image data of the (4N+4)-th frame period undergoes the second overdriving modulation. In FIG. 9B, the second overdriving modulation value is modified to a value M7 which is smaller than the value $M_6$.

In FIG. 9C, left eye image data of the (4N+1)-th and (4N+2)-th frame periods has a G63 grayscale value, and right eye image data of the (4N+3)-th and (4N+4)-th frame periods has a G63 grayscale value. The right eye image data of the (4N+3)-th frame period undergoes the first overdriving modulation. In FIG. 9C, since the right eye image data of the (4N+3)-th frame period is the same as the left eye image data of the (4N+2)-th frame period, the right eye image data of the (4N+3)-th frame period is modulated as shown in Equation (4). Therefore, the right eye image data of the (4N+3)-th frame period is set to reach the G63 grayscale value which is a data value for the current frame.

The right eye image data of the (4N+4)-th frame period undergoes the second overdriving modulation. In FIG. 9C, the second overdriving modulation value is set to the G63 grayscale value which is the same as the first overdriving modulation value. The reason is that since the right eye image data of the (4N+3)-th and (4N+4)-th frame periods has the same grayscale value as the left eye image data of the (4N+2)-th frame period, the overdriving modulation as shown in Equation (4) is not necessary.

FIG. 10 is a diagram illustrating the data modulation method in FIGS. 9A to 9C using a lookup table. In FIGS. 9A to 9C, the grayscale values for the right eye image data of the (4N+3)-th and (4N+4)-th frame periods are the G63 grayscale and are the same as each other, and the grayscale values for the left eye image data of the (4N+2)-th frame period are the G255 grayscale, the G127 grayscale, and the G63 grayscale, and different from each other.

When the grayscale value for the left eye image data of the (4N+2)-th frame period is the G255 grayscale, the right eye image data of the (4N+3)-th frame period is modulated to reach the value $M_4$, and the right eye image data of the (4N+4)-th frame period is modulated to reach the value $M_5$. When the grayscale value for the left eye image data of the (4N+2)-th frame period is the G127 grayscale, the right eye image data of the (4N+3)-th frame period is modulated to reach the value $M_6$, and the right eye image data of the (4N+4)-th frame period is modulated to reach the value $M_7$. When the grayscale value for the left eye image data of the (4N+2)-th frame period is the G63 grayscale, the right eye image data of the (4N+3)-th and (4N+4)-th frame periods is set to reach the G63 grayscale value as it is.

Figure 11A:
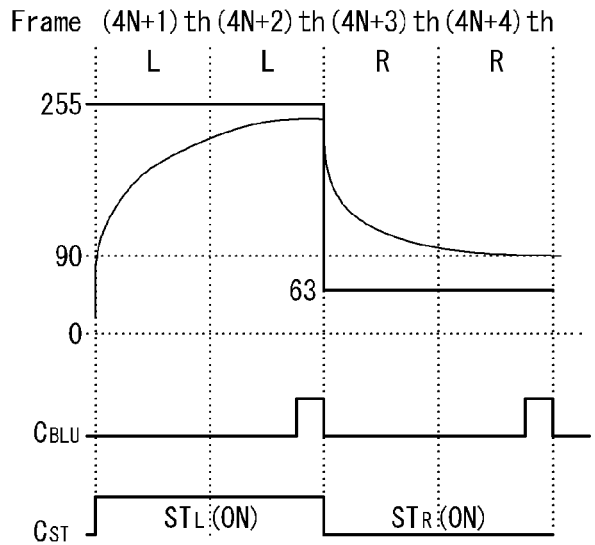
FIGS. 11A to 11C are waveform diagrams illustrating a data modulation method according to a fourth embodiment of this document.
Figure 11B:
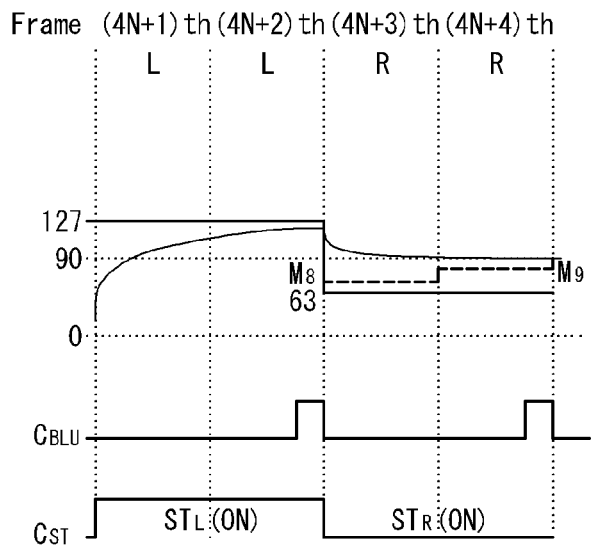
Figures 11C, 12:
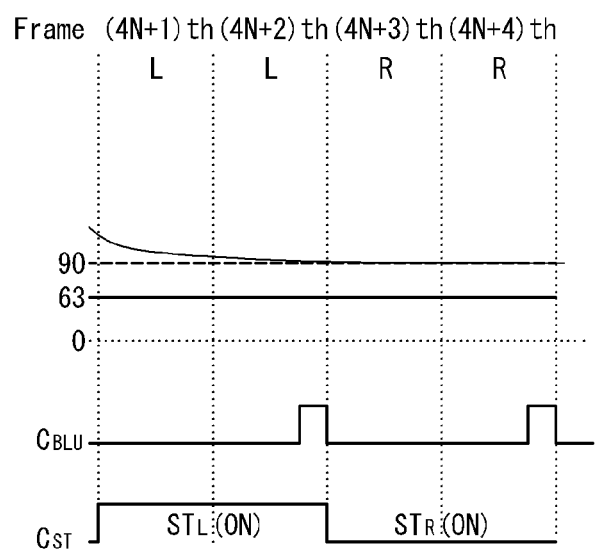
FIG. 12 is a diagram illustrating the data modulation method in FIGS. 11A to 11C using a lookup table.

FIGS. 11A to 11C are waveform diagrams illustrating a data modulation method according to a fourth embodiment of this document. Referring to FIGS. 11A to 11C, in the fourth embodiment of this document, the second overdriving modulation value is the same as the first overdriving modulation value or smaller than the first overdriving modulation value. The fourth embodiment of this document is for solving the case where the great difference between grayscale values for the left eye image data and the right eye image data results in not correctly representing the grayscale value for the left eye image data or the right eye image data even by the overdriving modulation, like the case in FIG. 3A.

In FIG. 11A, left eye image data of the (4N+1)-th and (4N+2)-th frame periods has a G255 grayscale value, and right eye image data of the (4N+3)-th and (4N+4)-th frame periods has a G63 grayscale value. The right eye image data of the (4N+3)-th frame period undergoes the first overdriving modulation. The first overdriving modulation during the (4N+3)-th frame period is performed by comparing the right eye image data of the (4N+3)-th frame period with the left eye image data of the (4N+2)-th frame period which is a previous frame period. The right eye image data of the (4N+4)-th frame period undergoes the second overdriving modulation. The second overdriving modulation value in FIG. 11A is the smaller than the first overdriving modulation value.

However, although the right eye image data of the (4N+3)-th and (4N+4)-th frame periods is modulated to reach the G0 grayscale value which is the maximum overdriving modulation value, since the difference between the grayscale values for the right eye image data and the left eye image data is great, the right eye image data cannot represent the G63 grayscale. In this case, like in FIG. 3A, there is a problem in that a grayscale for a current frame cannot be represented. Therefore, in order to solve this problem, a target brightness is measured, and the overdriving modulation is performed with respect to a grayscale enabling reaching the target brightness. In the case of FIG. 11A, although the right eye image data of the (4N+3)-th and (4N+4)-th frame periods has the G63 grayscale value, the right eye image data is modulated to reach a G90 grayscale which is a grayscale value enabling reaching a target brightness.

The first and second overdriving modulation for the left eye image data of the (4N+1)-th and (4N+2)-th frame periods is the same as the first and second overdriving modulation for the right eye image data of the (4N+3)-th and (4N+4)-th frame periods.

In FIG. 11B, left eye image data of the (4N+1)-th and (4N+2)-th frame periods has a G127 grayscale value, and right eye image data of the (4N+3)-th and (4N+4)-th frame periods has a G63 grayscale value. The right eye image data of the (4N+3)-th frame period undergoes the first overdriving modulation. The right eye image data of the (4N+3)-th frame period in FIG. 11B is modulated to reach the G90 grayscale value which enables reaching the target brightness in the same manner as FIG. 11A, and thus the right eye image data of the (4N+3)-th frame period is modulated to reach a value M8 greater than the G63 grayscale value and smaller than the G127 grayscale value. The right eye image data of the (4N+4)-th frame period undergoes the second overdriving modulation. The second overdriving modulation value is smaller than the first overdriving modulation value. Thus, the second overdriving modulation value becomes a value M9 smaller than the first overdriving modulation value M8.

In FIG. 11C, left eye image data of the (4N+1)-th and (4N+2)-th frame periods has a G63 grayscale value, and right eye image data of the (4N+3)-th and (4N+4)-th frame periods has a G63 grayscale value. The right eye image data of the (4N+3)-th frame period undergoes the first overdriving modulation. The right eye image data of the (4N+3)-th frame period in FIG. 11C is modulated to reach the G90 grayscale value which enables reaching the target brightness in the same manner as FIG. 11A, and thus the right eye image data of the (4N+3)-th frame period is set to reach the G90 grayscale value, not the G63 grayscale value which is a data value for the current frame. The right eye image data of the (4N+4)-th frame period undergoes the second overdriving modulation. The second overdriving modulation value is the same as the first overdriving modulation value. Thus, the second overdriving modulation value becomes the G90 grayscale value.

FIG. 12 is a diagram illustrating the data modulation method in FIGS. 11A to 11C using a lookup table. In FIGS. 11A to 11C, the grayscale values for the right eye image data of the (4N+3)-th and (4N+4)-th frame periods are the G63 grayscale and are thus the same as each other, and the grayscale values for the left eye image data of the (4N+2)-th frame period are the G255 grayscale, the G127 grayscale, and the G63 grayscale, and are thus different from each other.

When the grayscale value for the left eye image data of the (4N+2)-th frame period is the G255 grayscale, the right eye image data of the (4N+3)-th and (4N+4)-th frame periods is modulated to reach the G0 grayscale value. When the grayscale value for the left eye image data of the (4N+2)-th frame period is the G127 grayscale, the right eye image data of the (4N+3)-th frame period is modulated to reach the value $M_8$, and the right eye image data of the (4N+4)-th frame period is modulated to reach the value $M_9$. When the grayscale value for the left eye image data of the (4N+2)-th frame period is the G63 grayscale, the right eye image data of the (4N+3)-th and (4N+4)-th frame periods is set to reach the G63 grayscale value as it is.

Figure 13:
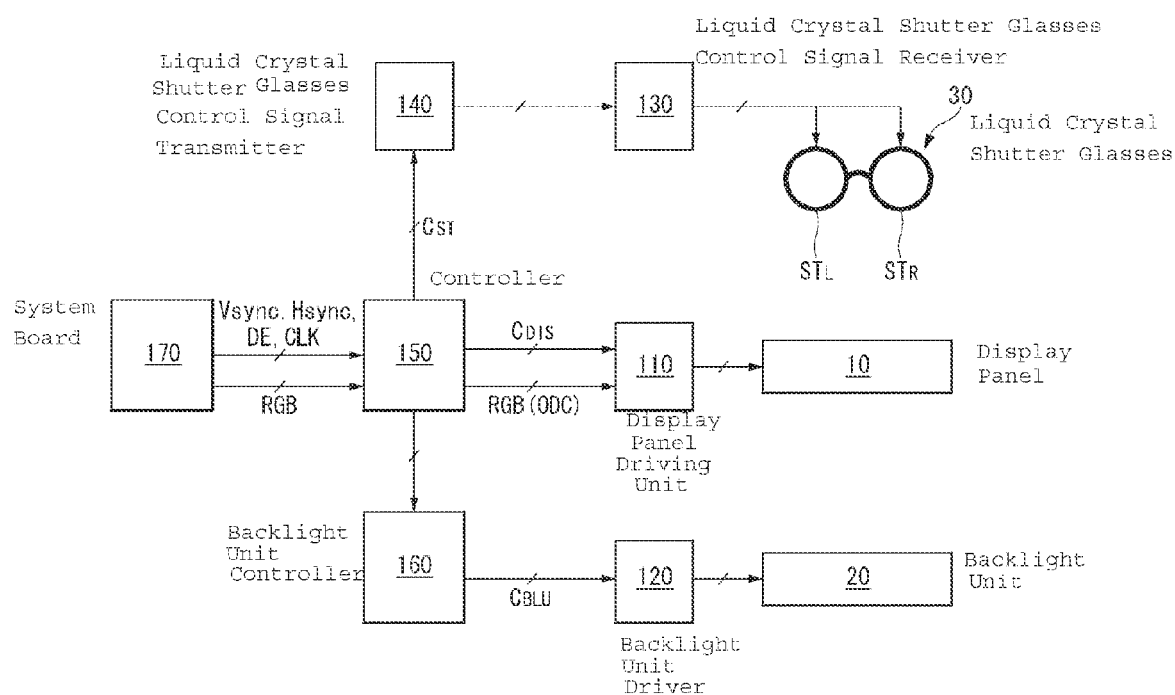
FIG. 13 is a block diagram illustrating a liquid crystal display using the data modulation method according to the embodiment of this document.

FIG. 13 is a block diagram illustrating a stereoscopic image display device according to an embodiment of this document. Referring to FIG. 13, the stereoscopic image display device comprises a display panel 10, a backlight unit 20, liquid crystal shutter glasses 30, a display panel driving unit 110, a backlight unit driver 120, a liquid crystal shutter glasses control signal receiver 130, a liquid crystal shutter glasses control signal transmitter 140, a controller 150, a backlight unit controller 160, and a system board 170.

The display panel 10 alternately displays left eye image data RGBL and right eye image data RGBR under the control of the controller 150. The display panel 10 may display 2D image data RGB in which left eye image data and right eye image data are not differentiated, under the control of the controller 150. The display panel 10 may employ a hold type display device which requires the backlight unit 20. The hold type display device may employ a transmissive liquid crystal display panel which converts light from the backlight unit 20, as a representative.

The transmissive liquid crystal display panel is provided with a thin film transistor ("TFT") substrate and a color filter substrate. A liquid crystal layer is disposed between the TFT substrate and the color filter substrate. The TFT substrate (lower glass substrate) is provided with data lines and gate lines (or scan lines) intersecting each other, and liquid crystal cells arranged in a matrix in cell regions defined by the intersection of the data lines and the gate lines. The TFTs disposed at the intersections of the data lines and the gate lines transmits data voltages supplied via the data lines to pixel electrodes in the liquid crystal cells, in response to scan pulses from the gate lines. For this, gate terminals of the TFTs are connected to the gate lines, and source terminals thereof are connected to the data lines. Drain terminals of the TFTs are connected to the pixel electrodes in the liquid crystal cells. Common electrodes opposite to the pixel electrodes are applied with a common voltage. The color filter substrate (upper glass substrate) is provided with black matrices and color filters. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Polarizers are respectively attached to the outer surfaces of the lower and upper glass substrate of the transmissive liquid crystal display panel, and alignment layers are formed on the inner surfaces having contact with the liquid crystal layer to set pretilt angles of the liquid crystal layer. Spacers are disposed between the upper glass substrate and the lower glass substrate so as to the cell gap of the liquid crystal layer. The transmissive liquid crystal display panel may be implemented by a liquid crystal display panel of any other type as well as liquid crystal display panels of the TN mode, the VA mode, the IPS mode, and the FFS mode.

The display panel driving unit 110 comprises a data driving circuit and a gate driving circuit. When the 3D images are implemented, the data driving circuit modifies the left eye image data RGBL and right eye image data RGBR output from the controller 150 to gamma compensation voltages with positive and negative polarities and generates analog data voltages with positive and negative polarities. The analog data voltages with positive and negative polarities output from the data driving circuit are supplied to the data lines in the display panel 10. The gate driving circuit sequentially supplies gate pulses (or scan pulses) synchronized with the data voltages to the gate lines in the display panel 10.

The backlight unit 20 provides light to the display panel 10 while turned on for a predetermined time, and turned off for the remaining time. The backlight unit 20 includes light sources which are turned on depending on driving powers supplied from the backlight unit driver 120, a light guide plate (or a diffusion plate), and a plurality of optical sheets. The backlight unit 20 may be implemented by a direct type backlight unit or an edge type backlight unit. The light sources of the backlight unit 20 may comprise one or more of HCFL (hot cathode fluorescent lamp), CCFL (cold cathode fluorescent lamp), EEFL (external electrode fluorescent lamp), and LED (light emitting diode).

The backlight unit driver 120 generates the driving powers for turning on the light sources of the backlight unit 20. The backlight unit driver 120 periodically supplies the driving powers to the light sources in the ON and OFF manner under the control of the backlight unit controller 160.

The liquid crystal shutter glasses 30 comprise a left eye shutter $ST_L$ and a right eye shutter $ST_R$ which are electrically controlled independently from each other. Each of the left eye shutter $ST_L$ and the right eye shutter $ST_R$ comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and OFF voltages. Each of the left eye shutter $ST_L$ and the right eye shutter $ST_R$ transmits light from the display panel 10 when the ON voltage is applied to the second transparent electrode, whereas it blocks light from the display panel 10 when the OFF voltage is applied to the second transparent electrode.

The liquid crystal shutter control signal transmitter 140 is connected to the controller 150 and transmits a liquid crystal shutter glasses control signal $C_{ST}$ to the liquid crystal shutter glasses control signal receiver 130 via a wired or wireless interface. The liquid crystal shutter glasses control signal receiver 130 is installed in the liquid crystal shutter glasses 30, receives the liquid crystal shutter control signal $C_{ST}$ via a wired or wireless interface, and alternately opens and closes the left eye shutter $ST_L$ and the right eye shutter $ST_R$ in response to the liquid crystal shutter control signal $C_{ST}$.

When the liquid crystal shutter control signal $C_{ST}$ having a first logic value is input to the liquid crystal shutter glasses control signal receiver 130, the second transparent electrode of the left eye shutter $ST_L$ is applied with the ON voltage, whereas the second transparent electrode of the right eye shutter $ST_R$ is applied with the OFF voltage. When the shutter control signal having a second logic value is input to the liquid crystal shutter glasses control signal receiver 130, the second transparent electrode of the left eye shutter $ST_L$ is applied with the OFF voltage, whereas the second transparent electrode of the right eye shutter $ST_R$ is applied with the ON voltage. Thus, the left eye shutter $ST_L$ of the liquid crystal shutter glasses 30 is opened when the liquid crystal shutter control signal $C_{ST}$ having the first logic value is generated, and the right eye shutter $ST_R$ of the shutter glasses 30 is opened when the liquid crystal shutter control signal $C_{ST}$ having the second logic value is generated. The first logic value may be set as a high logic voltage and the second logic value may be set as a low logic voltage.

Display panel control signals $C_{DIS}$ include data timing signals for controlling operation timings of the data driving circuit and gate timing control signals for controlling operation timings of the gate driving circuit. The data timing control signals include a source start pulse SSP, a source sampling clock SSC, a source output enable signal SOE, a polarity control signal POL, and so on. The source start pulse SSP controls data sampling start timings in the data driving circuit. The source sampling clock SSC is a clock signal which controls data sampling timings with respect to a rising edge or a falling edge in the data driving circuit. If the digital video data to be input to the data driving circuit is transmitted by a mini LVDS interface specification, the source start pulse SSP and the source sampling clock SSC may be omitted. The polarity control signal POL reverses polarities of the data voltages output from the data driving circuit at a cycle of L (where L is a positive integer) horizontal period. The source output enable signal SOE controls output timings of the data driving circuit.

The gate timing control signals include a gate start pulse GSP, gate shift clocks GSC, a gate output enable signal GOE, and so forth. The gate start pulse GSP controls a timing of the first gate pulse. The gate shift clocks GSC are clock signals are used as clock signals for shifting the gate start pulse GSP. The gate output enable signal GOE controls output timings of the gate driving circuit.

The controller 150 generates an odd and even frame distinction signal from 3D image data RGB. The controller 150 generates the liquid crystal shutter glasses control signal $C_{ST}$ using the image data RGB and the odd and even frame distinction signal. The controller 150 transmits the liquid crystal shutter glasses control signal $C_{ST}$ to the liquid crystal shutter glasses control signal transmitter 140. The liquid crystal shutter glasses control signal $C_{ST}$ is transmitted to the liquid crystal shutter glasses control signal receiver 130, thereby alternately opening and closing the left eye shutter $ST_L$ and the right eye shutter $ST_R$ of the liquid crystal shutter glasses 30.

The controller 150 receives the image data RGB from the system board 170 and also has a function of a data modulation unit which performs the overdriving modulation for the input image data RGB. The controller 150 outputs the image data RGB (ODC) having undergone the overdriving modulation to the display panel driving unit 110. This will be described in detail later with reference to FIG. 14.

The backlight unit controller 160 outputs the backlight unit control signal $C_{BLU}$ received from the controller 150 to the backlight unit driver 120. The backlight unit control signal $C_{BLU}$ controls the backlight unit driver 120 and periodically turns on and off the light sources of the backlight unit 20.

The system board 170 modifies the resolution of the image data RGB suitable for the resolution of the display panel 10, and transmits timing signals Vsync, Hsync, DE, CLK, and the like to the controller 150.

Figure 14:
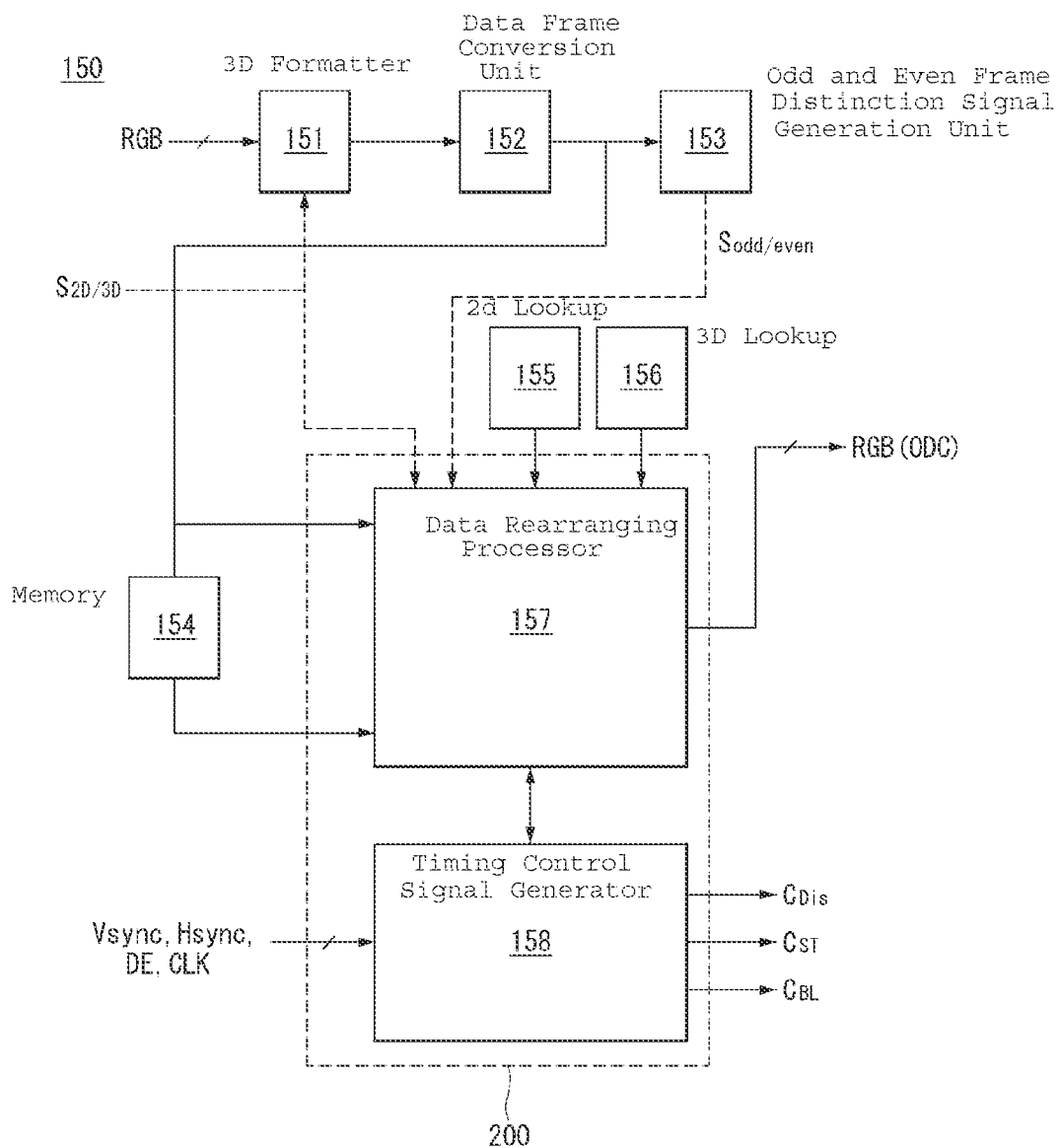
FIG. 14 is a detailed block diagram of the timing controller in FIG. 13.

FIG. 14 is a detailed block diagram illustrating the controller 150 in FIG. 13. In FIG. 14, in order to perform the overdriving modulation, the controller 150 comprises a 3D formatter 151, a data frame conversion unit 152, an odd and even frame distinction signal generation unit 153, a memory 154, a 2D lookup table 155, a 3D lookup table 156, and a timing controller 200. The timing controller 200 includes a data rearranging processor 157 and a timing control signal generator 158.

In FIG. 14, the image data RGB is input to the 3D formatter 151. The 3D formatter 151 may determine whether the input image data RGB is for 2D images or 3D images based on a 2D or 3D mode signal. When the image data RGB for 2D images is input, the 3D formatter 151 does not convert the image data RGB and outputs it to the data frame conversion unit 152 as it is.

The image data RGB for 3D images has right eye image data and left eye image data in one frame, and when the image data for 3D images is input, the 3D formatter 151 divides the input image RGB into the right eye image data and the left eye image data. Therefore, when the 3D images are implemented, a frame frequency of image data output from the 3D formatter 151 is twice the frame frequency of the input image data RGB.

The data frame conversion unit 152 multiplies frames of the image data RGB output from the 3D formatter 151 by two times or four times. First, when the input data for 2D images is input, the data frame conversion unit 152 inserts, into adjacent frame images of the input data RGB, three frame images which are predicted through the MEMC (motion estimation/motion compensation), thereby multiplying the frame frequency by four times. Thus, the image data for 2D images of which the input frame frequency is, for example, 60 Hz has the frame frequency of 240 Hz. The MEMC is for improving the motion picture response time (MPRT), and is a technique used to insert predicted images into adjacent frames.

When the image data RGB for 3D images which is divided into the left eye image data and the right eye image data is input, the data frame conversion unit 152 respectively doubles the left eye image data and the right eye image data, to output left eye image data of the (4N+1)-th and (4N+2)-th frame periods and right eye image data of the (4N+3)-th and (4N+4)-th frame periods. Therefore, the image data for 3D images having the frame frequency of 120 Hz input to the data frame conversion unit 152 is output at 240 Hz.

The image data for 3D images output from the data frame conversion unit 152 is input to the controller 157 and then stored in the memory 154. The image data for 2D images output from the 3D formatter 151 is also input to the controller 157 and then stored in the memory 154. The memory 154 stores the image data for one frame period, and outputs the image data as previous frame data to the data rearranging processor 157.

In addition, the image data for 3D images output from the data frame conversion unit 152 is input to the odd and even frame distinction signal generation unit 153. The odd and even frame distinction signal generation unit 153 receives the left eye image data of the (4N+1)-th and (4N+2)-th frame periods and the right eye image data of the (4N+3)-th and (4N+4)-th frame periods, and generates odd and even frame distinction signal $S_{odd/even}$ indicating that data of the (4N+1)-th frame period and the (4N+3)-th frame period is odd data and data of the (4N+2)-th frame period and the (4N+4)-th frame period is even data. The odd and even frame distinction signal $S_{odd/even}$ is input to the controller 157.

The data rearranging processor 157 compares current frame data with previous frame data output from the memory 154 to output the image data RGB (ODC) having undergone the overdriving modulation. The data rearranging processor 157 may determine whether the input image data RGB is for 2D images or 3D images based on input the 2D or 3D mode signal.

The timing control signal generator 158 generates the display panel control signals $C_{DIS}$, the control signal $C_{ST}$ and the backlight unit control signal $C_{BTU}$ based on timing signals from the system board 170, in order to synchronize an operation timing of the liquid crystal shutter glasses 30 and the backlight unit 20 with the image data displayed on the display panel 10.

When the image data for 2D images is input to the controller 157, the 2D lookup table 155 receives the current frame data and the previous frame data, and outputs image data RGB (ODC) having undergone the overdriving modulation.

When the image data for 3D images is input to the controller 157, the 3D lookup table 156 receives the current frame data and the previous frame data and the odd and even frame distinction signal $S_{odd/even}$, and outputs image data RGB (ODC) having undergone the overdriving modulation. The 3D lookup table 156 may be implemented by a single lookup table which stores overdriving modulation value for all of the odd and even frames. As shown in FIGS. 6, 8, 10 and 12, for example, the previous frames correspond to the even frames for the 4N-th, (4N+2)-th, and (4N+4)-th frame periods, while the current frames correspond to the odd frames for the (4N+1)-th and (4N+3)-th frame periods. Also, the 3D lookup table 156 may be implemented by an odd lookup table and an even lookup table which separately stores overdriving modulation values for the odd frames and the even frames.

Since the left eye image data of the (4N+1)-th and (4N+2)-th frame periods and the right eye image data of the (4N+3)-th and (4N+4)-th frame periods can be determined using the odd and even frame distinction signal $S_{odd/even}$, the overdriving modulation described with reference to FIGS. 3 to 12 can be performed. The image data RGB (ODC) having undergone the overdriving modulation is output to the display panel driving unit 110. According to this document, when 3D images are implemented, left eye images are consecutively displayed for two frame periods, and then right eye images are consecutively displayed for two frame periods. The first and second overdriving modulations are performed for the two frame periods when the left eye images or the right eye images are displayed. As a result, it is possible to correctly represent brightness for a grayscale for a current frame regardless of a previous frame data and to improve the 3D crosstalk.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A data modulation method comprising:
   comparing a first left eye image data of a (4N+1)-th (where N is a positive integer) frame period with previous frame data of a 4N-th frame period, selecting a preliminary modulation value for a left eye image based on a result of the comparison, and preliminarily modulating the first left eye image data to reach a target brightness of the first left eye image data using the preliminary modulation value for the left eye image;
   secondarily modulating a second left eye image data of a (4N+2)-th frame period to reach a target brightness of the second left eye image data using a secondary modulation value for the left eye image, the secondary modulation value for the left eye image being equal to or smaller than the preliminary modulation value for the left eye image;
   comparing a first right eye image data of a (4N+3)-th frame period with previous frame data of the (4N+2)-th frame period, selecting a preliminary modulation value for a right eye image based on a result of the comparison, and preliminarily modulating the first right eye image data to reach a target brightness of the first right eye image data using the preliminary modulation value for the right eye image; and
   secondarily modulating a second right eye image data of a (4N+4)-th frame period to reach a target brightness of the second right eye image data using a secondary modulation value for the right eye image, the secondary modulation value for the right eye image being equal to or smaller than the preliminary modulation value for the right eye image.

2. The data modulation method of claim 1, wherein the data modulation method is an over-driving modulation method for 3D image display.

3. The data modulation method of claim 1, wherein the secondary modulation value for the left eye image is equal to the preliminary modulation value for the left eye image, and the secondary modulation value for the right eye image is equal to the preliminary modulation value for the right eye image.

4. The data modulation method of claim 1, wherein the secondary modulation value for the left eye image is smaller than the preliminary modulation value for the left eye image when the first left eye image data of the (4N+1)-th frame period is not identical to the previous frame data of a 4N-th frame period, and the secondary modulation value for the left eye image is equal to the preliminary modulation value for the left eye image when the first left eye image data of the (4N+1)-th frame period is identical to the previous frame data of a 4N-th frame period; and the secondary modulation value for the right eye image is smaller than the preliminary modulation value for the right eye image when the first right eye image data of the (4N+3)-th frame period is not identical to the previous frame data of a (4N+2)-th frame period, and the secondary modulation value for the right eye image is equal to the preliminary modulation value for the right eye image when the first right eye image data of the (4N+3)-th frame period is identical to the previous frame data of a (4N+2)-th frame period.

5. A data modulation method comprising:
measuring a first target brightness of each grayscale of a first left eye image data of a (4N+1)-th (where N is a positive integer) frame period, to obtain a first target data for enabling reaching the first target brightness;
comparing the first target data with previous frame data of a 4N-th frame period, selecting a preliminary modulation value for a left eye image based on a result of the comparison, and preliminarily modulating the first left eye image data to reach the first target brightness using the preliminary modulation value for the left eye image;
secondarily modulating a second left eye image data of a (4N+2)-th frame period to reach the first target brightness using a secondary modulation value for the left eye image, the secondary modulation value for the left eye image being equal to or smaller than the preliminary modulation value for the left eye image;
measuring a second target brightness of each grayscale of a first right eye image data of a (4N+3)-th frame period, to obtain a second target data for enabling reaching the second target brightness;
comparing the second target data with previous frame data of the (4N+2)-th frame period, selecting a preliminary modulation value for a right eye image based on a result of the comparison, and preliminarily modulating the first right eye image data to reach the second target brightness using the preliminary modulation value for the right eye image; and
secondarily modulating a second right eye image data of a (4N+4)-th frame period to reach the second target brightness using a secondary modulation value for the right eye image, the secondary modulation value for the right eye image being equal to or smaller than the preliminary modulation value for the right eye image.

6. The data modulation method of claim 5, wherein the data modulation method is an over-driving modulation method for 3D image display.

7. The data modulation method of claim 5, wherein the secondary modulation value for the left eye image is equal to the preliminary modulation value for the left eye image, and the secondary modulation value for the right eye image is equal to the preliminary modulation value for the right eye image.

8. The data modulation method of claim 7, wherein the preliminary modulation value for the left eye image is selected to be equal to the value of the first left eye image data of the (4N+1)-th frame period when the first left eye image data of the (4N+1)-th frame period is far more larger than the previous frame data of a 4N-th frame period; and
the preliminary modulation value for the right eye image is selected to be equal to the value of the first right eye image data of the (4N+3)-th frame period when the first right eye image data of the (4N+3)-th frame period is far more larger than the previous frame data of a (4N+2)-th frame period.

9. The data modulation method of claim 5, wherein
the preliminary modulation value for the left eye image is selected to be equal to the value of the first left eye image data of the (4N+1)-th frame period when the difference between grayscale values for the first left eye image data of the (4N+1)-th frame period and the previous frame data of a 4N-th frame period are so great that the grayscale values for the modulated image data can not represent the target grayscale of the current frame;
the secondary modulation value for the left eye image is smaller than the preliminary modulation value for the left eye image when the first left eye image data of the (4N+1)-th frame period is slightly larger than the previous frame data of a 4N-th frame period; and
the secondary modulation value for the left eye image is equal to the preliminary modulation value for the left eye image when the first left eye image data of the (4N+1)-th frame period is identical to the previous frame data of a 4N-th frame period;
the preliminary modulation value for the right eye image is selected to be equal to the value of the first right eye image data of the (4N+3)-th frame period when the first right eye image data of the (4N+3)-th frame period is far more larger than the previous frame data of a (4N+2)-th frame period;
the secondary modulation value for the right eye image is smaller than the preliminary modulation value for the right eye image when the first right eye image data of the (4N+3)-th frame period is slightly smaller than the previous frame data of a (4N+2)-th frame period;
the secondary modulation value for the right eye image is equal to the preliminary modulation value for the right eye image when the first right eye image data of the (4N+3)-th frame period is identical to the previous frame data of a (4N+2)-th frame period.

10. The data modulation method of claim 9, wherein
the secondary modulation value for the left eye image and the preliminary modulation value for the left eye image are equal to the value of first left eye image data of the (4N+1)-th frame when the first left eye image data of the (4N+1)-th frame period is identical to the previous frame data of a 4N-th frame period; and
the secondary modulation value for the right eye image and the preliminary modulation value for the right eye image are equal to the value of first right eye image data of the (4N+3)-th frame when the first right eye image data of the (4N+3)-th frame period is identical to the previous frame data of a (4N+2)-th frame period.

11. A liquid crystal display comprising:
a display panel configured to display a left eye image during (4N+1)-th (where N is a positive integer) and (4N+2)-th frame periods and display a right eye image during 4N-th, (4N+3)-th and (4N+4)-th frame periods, according to left eye image data and right eye image data; and
a data modulation unit configured to modulate each piece of data during the (4N+1)-th frame period to the (4N+4)-th frame period,
wherein the data modulation unit is configured to:
compare a first left eye image data of the (4N+1)-th frame period with previous frame data of a 4N-th frame period, select a preliminary modulation value for the left eye image based on a result of the comparison, and preliminarily modulate the first left eye image data of the (4N+1)-th frame period to reach a target brightness of the first left eye image data using the preliminary modulation value for the left eye image;
secondarily modulate a second left eye image data of a (4N+2)-th frame period to reach a target brightness of the second right eye image data using a secondary modulation value for the left eye image, the secondary modulation value for the left eye image being equal to or smaller than the preliminary modulation value for the left eye image;

compare a first right eye image data of a (4N+3)-th frame period with previous frame data of the (4N+2)-th frame period, select a preliminary modulation value for a right eye image based on a result of the comparison, and preliminarily modulate the first right eye image data of the (4N+3)-th frame period to reach a target brightness of the first right eye image data using the preliminary modulation value for the right eye image; and secondarily modulate a second right eye image data of a (4N+4)-th frame period to reach a target brightness of the second right eye image data using the secondary modulation value for the right eye image, the secondary modulation value for the right eye image being equal to or smaller than the preliminary modulation value for the right eye image.

12. The liquid crystal display of claim 11, wherein the secondary modulation value for the left eye image is equal to the preliminary modulation value for the left eye image, and the secondary modulation value for the right eye image is equal to the preliminary modulation value for the right eye image.

13. The liquid crystal display of claim 11, wherein the secondary modulation value for the left eye image is smaller than the preliminary modulation value for the left eye image when the first left eye image data of the (4N+1)-th frame period is not identical to the previous frame data of a 4N-th frame period, and the secondary modulation value for the left eye image is equal to the preliminary modulation value for the left eye image when the first left eye image data of the (4N+1)-th frame period is identical to the previous frame data of a 4N-th frame period; and the secondary modulation value for the right eye image is smaller than the preliminary modulation value for the right eye image when the first right eye image data of the (4N+3)-th frame period is not identical to the previous frame data of a (4N+2)-th frame period, and the secondary modulation value for the right eye image is equal to the preliminary modulation value for the right eye image when the first right eye image data of the (4N+3)-th frame period is identical to the previous frame data of a (4N+2)-th frame period.

14. The liquid crystal display of claim 11, wherein the data modulation unit comprises:
a controller configured to control the operation of the data modulation unit;
a memory configured to store the left eye image and the right eye image;
an odd and even data distinction signal generation unit configured to generate an odd and even data distinction signal indicating that data during the (4N+1)-th and (4N+3)-th frame periods is odd data and data during the (4N+2)-th and (4N+4)-th frame periods is even data; and
a 3D lookup table configured to receive previous frame data, current frame data, and the odd and even data distinction signal, and output a modulation value stored in an associated input address.

15. The liquid crystal display of claim 14, wherein the data modulation unit further comprises a 2D lookup table configured to receive previous frame data and the current frame data and output a modulation value stored in an associated input address when 2D images are implemented.

16. A liquid crystal display comprising:
a display panel configured to display a left eye image during (4N+1)-th (where N is a positive integer) and (4N+2)-th frame periods and display a right eye image during 4N-th, (4N+3)-th and (4N+4)-th frame periods, according to left eye image data and right eye image data;
a photo sensor disposed on the display panel, for measuring the target brightness of each grayscale of the left eye image data and right eye image data; and
a data modulation unit configured to modulate each piece of data during the (4N+1)-th frame period to the (4N+4)-th frame period,
wherein the data modulation unit is configured to:
measure a first target brightness of each grayscale of a first left eye image data of a (4N+1)-th (where N is a positive integer) frame period, to obtain a second target data for enabling reaching the second target brightness;
compare the first target data with previous frame data of a 4N-th frame period, select a preliminary modulation value for a left eye image based on a result of the comparison, and preliminarily modulate the first left eye image data to reach the preliminary modulation value for the left eye image;
secondarily modulate a second left eye image data of a (4N+2)-th frame period to reach a secondary modulation value for the left eye image, the secondary modulation value for the left eye image being equal to or smaller than the preliminary modulation value for the left eye image;
measure a second target brightness of each grayscale of a first right eye image data of a (4N+3)-th frame period, to obtain a second target data for enabling reaching the second target brightness;
compare the second target data with previous frame data of the (4N+2)-th frame period, select a preliminary modulation value for a right eye image based on a result of the comparison, and preliminarily modulate the first right eye image data to reach the preliminary modulation value for the right eye image; and
secondarily modulate a second right eye image data of a (4N+4)-th frame period to reach a secondary modulation value for the right eye image, the secondary modulation value for the right eye image being equal to or smaller than the preliminary modulation value for the right eye image.

17. The liquid crystal display of claim 16, wherein the secondary modulation value for the left eye image is equal to the preliminary modulation value for the left eye image, and the secondary modulation value for the right eye image is equal to the preliminary modulation value for the right eye image.

18. The liquid crystal display of claim 17, wherein the preliminary modulation value for the left eye image is selected to be equal to the value of the first left eye image data of the (4N+1)-th frame period when the first left eye image data of the (4N+1)-th frame period is far more larger than the previous frame data of a 4N-th frame period; and
the preliminary modulation value for the right eye image is selected to be equal to the value of the first right eye image data of the (4N+3)-th frame period when the first right eye image data of the (4N+3)-th frame period is far more larger than the previous frame data of a (4N+2)-th frame period.

19. The liquid crystal display of claim 16, wherein
the preliminary modulation value for the left eye image is selected to be equal to the value of the first left eye image data of the (4N+1)-th frame period when the first left eye image data of the (4N+1)-th frame period is far more larger than the previous frame data of a 4N-th frame period;

the secondary modulation value for the left eye image is smaller than the preliminary modulation value for the left eye image when the first left eye image data of the (4N+1)-th frame period is slightly larger than the previous frame data of a 4N-th frame period; and the secondary modulation value for the left eye image is equal to the preliminary modulation value for the left eye image when the first left eye image data of the (4N+1)-th frame period is identical to the previous frame data of a 4N-th frame period;

the preliminary modulation value for the right eye image is selected to be equal to the value of the first right eye image data of the (4N+3)-th frame period when the first right eye image data of the (4N+3)-th frame period is far more larger than the previous frame data of a (4N+2)-th frame period;

the secondary modulation value for the right eye image is smaller than the preliminary modulation value for the right eye image when the first right eye image data of the (4N+3)-th frame period is slightly smaller than the previous frame data of a (4N+2)-th frame period;

the secondary modulation value for the right eye image is equal to the preliminary modulation value for the right eye image when the first right eye image data of the (4N+3)-th frame period is identical to the previous frame data of a (4N+2)-th frame period.

20. The liquid crystal display of claim 16, wherein the data modulation unit comprises:

a controller;

a memory configured to store the left eye image and the right eye image;

an odd and even data distinction signal generation unit configured to generate an odd and even data distinction signal indicating that data during the (4N+1)-th and (4N+3)-th frame periods is odd data and data during the (4N+2)-th and (4N+4)-th frame periods is even data; and a 3D lookup table configured to receive previous frame data, current frame data, and the odd and even data distinction signal, and output a modulation value stored in an associated input address.

21. The liquid crystal display of claim 20, wherein the data modulation unit further comprises a 2D lookup table configured to receive previous frame data and the current frame data and output a modulation value stored in an associated input address when 2D images are implemented.

* * * * *